United States Patent [19]

Knoth et al.

[11] Patent Number: 4,608,074

[45] Date of Patent: Aug. 26, 1986

[54] GOB DISTRIBUTOR

[75] Inventors: Werner-Dieter Knoth; Helmut Hüllen, both of Essen; Klaus Kopatz, Bottrop, all of Fed. Rep. of Germany

[73] Assignee: VEBA-GLAS AG, Essen, Fed. Rep. of Germany

[21] Appl. No.: 673,776

[22] Filed: Nov. 21, 1984

[30] Foreign Application Priority Data

Nov. 22, 1983 [DE] Fed. Rep. of Germany ....... 3342062

[51] Int. Cl.$^4$ ............................................. C03B 9/40
[52] U.S. Cl. ..................................... 65/164; 65/160; 65/163; 65/DIG. 13; 364/473; 364/476
[58] Field of Search ......... 65/164, 163, 160, DIG. 13; 364/473, 476

[56] References Cited

U.S. PATENT DOCUMENTS

| 4,108,623 | 8/1978 | Cardenas-Franco | 65/164 X |
| 4,152,134 | 5/1979 | Dowling | 65/164 X |
| 4,357,157 | 11/1982 | Cardenas-Franco et al. | 65/164 |
| 4,453,963 | 6/1984 | Larson et al. | 65/164 X |
| 4,459,146 | 7/1984 | Farkas et al. | 65/164 X |

FOREIGN PATENT DOCUMENTS

| 2501109 | 8/1977 | Fed. Rep. of Germany . |
| 3113267 | 4/1981 | Fed. Rep. of Germany . |
| 523855 | 6/1972 | Switzerland . |

Primary Examiner—Arthur Kellog
Attorney, Agent, or Firm—Karl F. Ross; Herbert Dubno

[57] ABSTRACT

An apparatus for controlling a gob distributor of an IS or RIS machine for manufacturing hollow glass articles. The apparatus comprises a hydraulic drive, which is connectible to a position control device associated with the gob distributor, so as to move the distributor in oscillating or swinging motions. The hydraulic drive is controlled by a valve which, in turn, is actuated by a computer unit. The electronic arrangement of the apparatus includes an adapter, a digital-analog converter operatively connectible between the valve and the adapter, a parallel interface and connectible to the latter, a computer, a memory, and a synchronizer. The apparatus affords swift, precise, and controlled deposition of a glass gob which leads to the production of a parison in glass article manufacture.

8 Claims, 2 Drawing Figures

GOB DISTRIBUTOR

CROSS REFERENCE TO RELATED APPLICATION

This application is related to the commonly assigned application Ser. No. 451,153 filed Nov. 29, 1982 (now abandoned) and the parent PCT application.

FIELD OF THE INVENTION

Our present invention relates to a switching or control system for or forming part of a gob distributor of an IS (Individual Section) or RIS (Rotational Individual Section) machine for manufacturing hollow glass articles and, more particularly, to a gob distributor which is coupled to a hydraulic drive for carrying out periodic oscillation.

BACKGROUND OF THE INVENTION

A hydraulically driven gob distributor for IS and RIS container making machines can be associated with a reversing valve, switch valve, or change-over valve.

IS machines for the production of hollow glass articles are equipped with gathering or preform molds and with pertaining finishing molds for these. Characteristic of such IS machines is that in each of the sequentially operated stations the same operations are performed in a sequential or timed manner in a predetermined pattern or cycle.

In general terms, the production sequence for hollow glass articles includes feeding the molten glass gob into a metallic gathering mold of the individual station, and pressing, blowing, blow-molding, etc. of the so-called parison. On transfer of the parison formed from the gob to the finishing molds of the respective stations, the ultimate shape is obtained by further blowing or evacuating of or at the exterior thereof.

Usually up to three molds are provided in the preliminary or gathering mold complex, i.e., single, double or triple molds, respectively. A similar grouping is then provided at the finishing mold section of a production station of an IS machine. The other stations of the machine are equipped in analogous manner. The individual production stations are linearly arranged. In the case of the RIS machines the finishing molds are arranged on a rotating table, whereby each gathering mold has at least two associated finishing molds.

The gob distributor for such machines for the production of glass articles feeds individual portions, i.e. gobs, of a continuously exiting fluid strand of glass into the individual channel or troughs of the stations of an IS, or RIS machine.

The gob distributor carries out swinging movements or oscillations which must be carried out with high precision and speed, so that under the conditions of high production rates, the glass gobs are deposited with sufficient accuracy in the inlet channels of the production stations of the machine. Within the predetermined angle of oscillation the gob distributor stops several times in accordance with the number of the production stations which are to be supplied with glass gobs. The sequence of the stops should be freely selectable within the maximum angle of oscillations for greatest versatility. The gob distributor is equipped with an oscillating drive whereby an adjustable control serves to attain the stop or unload position at the predetermined location.

The efficiency of such a gob distributor is a function of the velocity of the swinging movement and the accuracy of the holding or stop positioning. The use of various forms of drives depends on the type of energy input. As well, the control of such drives can be done using various energy media and, consequently, the lay-out of these varies as well.

A control system is described in Swiss Pat. No. 523 855 in which a mechanically driven and continuously rotated cam disc actuates a cam rod or impact rod. This rod actuates, in turn, the gob distributor. The positioning accuracy and the efficiency of this apparatus are largely influenced by the masses to be moved, the contact pressure of the rod, and the wear of the cam disc. In such apparatus, accordingly, use is made of a mechanical drive and a mechanical converter.

German patent publication DE-OS No. 2 501 109 describes an apparatus in which a mechanically driven cam disc operates a push rod. This rod actuates gear wheels and pinions, which in turn are operatively connected to a hydraulic valve. In this apparatus, accordingly, the gob distributor is mechanically driven and the control is achieved by mechanic-hydraulic means.

It is of disadvantage in such prior art apparatus that it is required to move relatively large masses, associated with at least temporary inertia and with insufficient accuracy due to the selected control media, during positioning in the stop positions of the gob distributor. The result is limited quality and productivity of the glass articles to be produced.

Considerable improvement is achieved with the apparatus according to German patent publication for an application DE-OS No. 31 13 267 corresponding to the PCT application. This apparatus includes a hydraulic actuated gob distributor, whereby the control of the hydraulic drive is achieved by a change-over (reversing) valve which, in turn, is actuated by an electronic computer and processor.

OBJECTS OF THE INVENTION

It is therefore a general object of the present invention to avoid the aforementioned, as well as other drawbacks of earlier gob distributors for IS and RIS machines.

It is also an object of the invention to provide an improved control for a gob distributor of the type briefly described in the foregoing which is simple in design and conducive to increased production and improved quality of the glass articles to be produced.

SUMMARY OF THE INVENTION

The above objects are attained by an apparatus which includes a change-over valve which is connected to an adapter via a digital-analog converter. In addition, to the adapter is connected, via an analog-digital converter, an angle-coder or the like, and the adapter is in operating connection with the drive of the gob distributor. The adapter and, accordingly, the angle-coder are connected, via a parallel interface, to a computer unit and a memory, as well as being coupled to a synchronizer.

The apparatus in accordance with the invention provides the advantage that the swinging or oscillation motions of the gob distributor are reproducible with high accuracy. Furthermore, the highest start acceleration and stop deceleration may be utilized. Programming (adjustment) of the angular positions is simple as are self-control (feedback) for holding of the introduced or preset values. Also, a uniform velocity can be maintained within the motions, and these are all feasible in spite of random or selective sequencing of the stop points.

In accordance with a preferred embodiment, the apparatus includes as change-over valve a proportionally operating reversing valve. Between the change-over valve and the converter there is interposed a servoamplifier.

In accordance with a further preferred embodiment, the adapter can be operatively connected to (a) a setpoint input device, and/or to (b) an actual-value input, and/or (c) an alarm device, and/or (d) an emergency stop.

BRIEF DESCRIPTION OF THE DRAWING

The above and other objects, features and advantages will become apparent from the following description, reference being made to the accompanying drawing in which.

SPECIFIC DESCRIPTION

Figure 1:
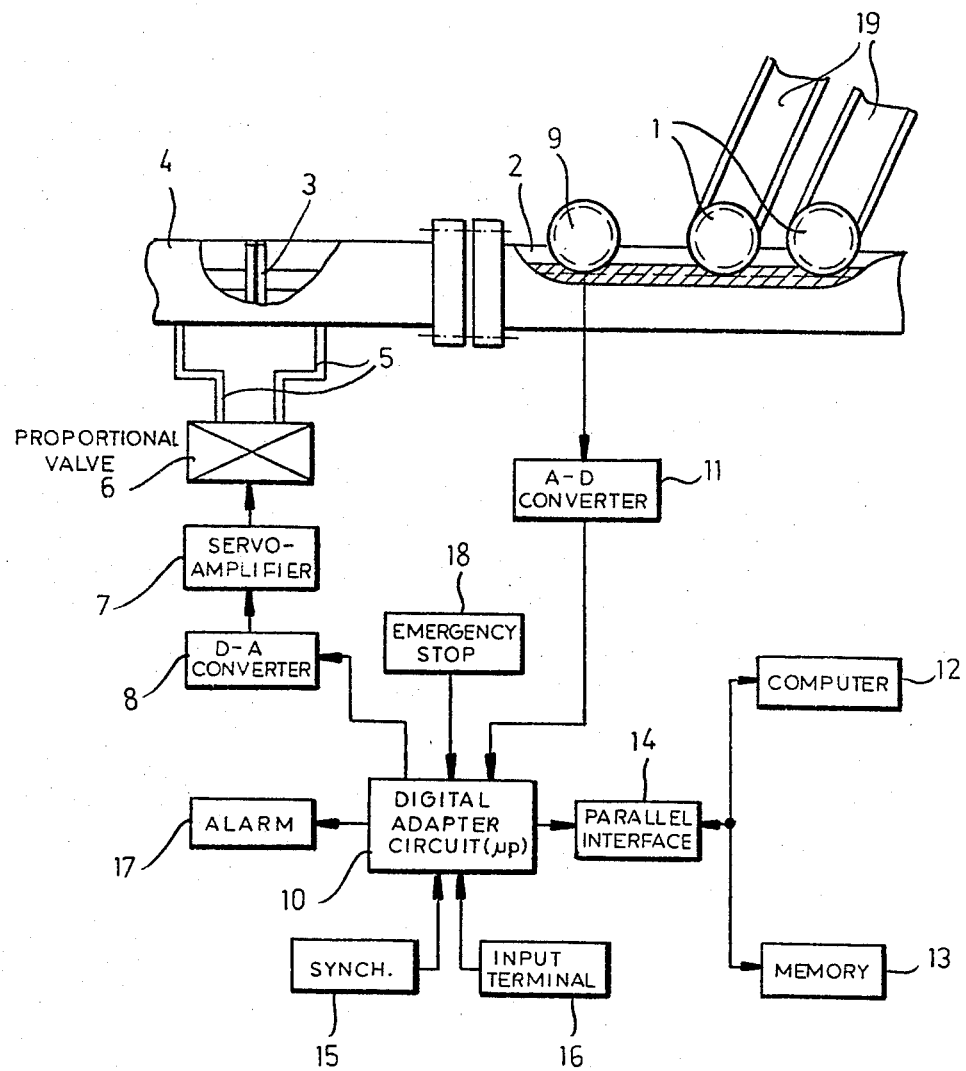
FIG. 1 is a schematic representation in block diagram form of a gob distributor in accordance with the present invention.

The gob distributor shown in FIG. 1 is a double drop distributor which has distributor pinions rotatable on axes 1. The pinions are driven via rack 2, by the piston 3 of the piston/cylinder assembly, generally referred to herein as hydraulic drive, piston/cylinder system, or hydraulic actuator or control (see the aforementioned application).

The double-acting piston 3 can be actuated from either side by the force of a hydraulic medium, supplied by the inlet conduits 5 which communicate with the interior of the actuator cylinder 4 in which the piston 3 is reciprocatable.

The direction of flow of the hydraulic medium, the moved mass thereof, and the point in time of the movement is determined by the valve 6, for example, a change-over valve, or reversing valve which is adapted to operate in a proportional manner. In FIG. 1 the lines between the individual electrical and/or electronic components represent electrical connections.

The valve 6 is controlled by electrical impulses which emanate from the servoamplifier 7. A digital-analog converter (d-a-converter) 8 is provided at the input of servoamplifier 7, and the d-a-converter 8 is connected to an adapter 10.

Control of the position which is actually attained by the gob distributor upon completion of an operational step is achieved by an angle-coder or angle-coding device 9, or similar position identification or control device. The drive of angle-coder 9 is represented by a gear wheel, indicated by the pitch circle in FIG. 1, with the movement or rotation thereof being imparted to the rack 2. The pulse emitter or other output of the angle-coder 9 transmits signals corresponding to the attained position, to the analog-digital converter (a-d converter) 11, and thus to the digitally operating adapter 10 which can have its own microprocessor and acts both as a comparator and a correlator as will be described.

The connection to the computer unit 12 with memory 13 is through the parallel interface 14.

Timing of the movement of the gob distributor arms or members 19 in the cyclic interaction with other mechanisms of the glass article machine is via synchronizer 15. Operational values, set-point values and other instructions (sequence of gob distribution), are entered, and representation of the actual conditions or values is carried out at terminal 16, which may include a display and keyboard.

Exceeding boundary conditions or predetermined limits are signaled by an alarm device 17 and an emergency stop 18 can inactivate the apparatus.

Operation of the apparatus may be summarized having regard to the following steps:

Values are entered at 16 using a keyboard.

Storage of the input data is effected in a volatile and/or nonvolatile memory 13.

Simulation of the resulting setpoint value condition.

Production of actual value state on the basis of the setpoint value condition.

Continuous comparison of the setpoint value condition and the actual value condition.

Determination of deviations which exceed a predetermined bandwidth of the ratio of setpoint values and actual values.

Correction of the deviations which exceed the bandwidth.

Detecting, reporting, and representation of the conditions and their deviations.

Testing of the individual functions.

Figure 2:
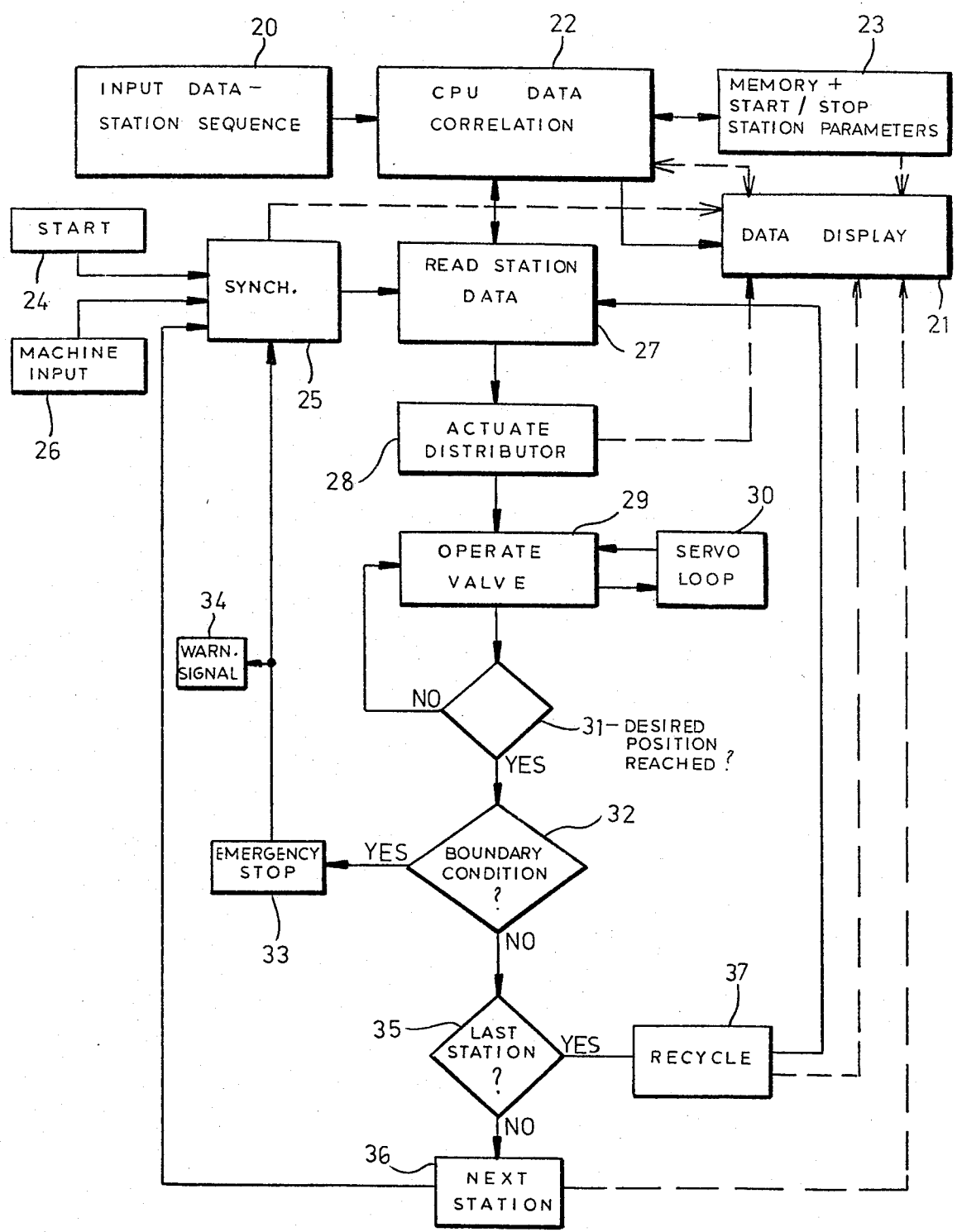
FIG. 2 is an information-flow-diagram therefor.

In FIG. 2 we have shown the operation of the system in greater detail.

Using the terminal 16 and its display, e.g. a CRT or printer, the start and stop criteria if not preprogrammed are inputted as set-point values to the computer 12 at 20, the inputted data also including selection of the station sequence. This data may all be displayed at 21 and is processed at 22 and stored at 23 in the memory 13.

When a start command is inputted at 24 through the terminal 16 to the adapter 10, the microprocessor of the latter reads the station data from the computer 12 via the parallel interface 14 and synchronizes this data with the digital input 25 from the synchronizer 15 which has a machine input 26.

If the data received by the adapter 10 is consistent with actuation of the gob distributor arms or members 19, the output of adapter 10, shown at 27 actuates the valve 6 via the D-A converter 8 and the servoamplifier 7. This "actuate" instruction is represented at 28.

The valve 6 is operated at 29 and the setpoint data for the specific station, called up by the adapter 10 is compared with the actual value data from A-D converter 11 to form within the adapter 10 a digital servo loop 30 which remains operative until the desired position is reached.

If the desired position is not reached as represented by the program step 31 the valve operation continues. If the desired position is reached, the adapter circuit 10 monitors for compliance at 32 with any boundary condition which may have been found to be relevant.

Should any of these have been exceeded, an emergency step instruction is given at 33 to activate the stop relay or switch 18 of the machine. A warning signal is also delivered at 34 to the alarm device 17.

If no boundary condition is exceeded, the adapter 10 determines at 35 whether the last station of a particular cycle has been reached. If not a "next station" instruction is given at 36. If the last station has been reached, the program is recycled at 37.

Broken lines represent display of the various conditions described so that the program station is always visible to the operator.

We claim:

1. A gob distributor for an IS machine for manufacturing hollow glass articles, comprising:
   a hydraulic drive operatively connected to a gob distributor member in such a way so as to move the gob distributor in angular oscillating movement;
   valve means including a reversing valve operatively connected to said hydraulic drive for controlling the flow of hydraulic medium in said hydraulic drive;
   computer means including a memory for actuating said valve means;
   a digital adapter circuit for operating said valve means;
   a digital-analog converter operatively connected between said valve means and said digital adapter circuit;
   a position control device responsive to the position of said member in the form of an angle coder;
   an analog-digital converter operatively connected between said digital adapter circuit and said angle coder; and
   a parallel interface operatively connecting said digital adapter circuit to said computer means and to a synchronizer for said machine.

2. The gob distributor defined in claim 1 wherein said reversing valve is a proportionally operable reversing valve.

3. The gob distributor defined in claim 1, further comprising a servoamplifier operatively connected between said valve means and said digital-analog converter.

4. The gob distributor defined in claim 1, further comprising a setpoint value input connected to said digital adapter circuit.

5. The gob distributor defined in claim 1, further comprising an emergency stop unit connected to said digital adapter circuit for automatically stopping said distributor upon the development of a condition exceeding a predetermined limit.

6. The gob distributor defined in claim 1, further comprising an alarm unit connected to said digital adapter circuit for automatically generating an alarm upon the development of a condition exceeding a predetermined limit.

7. The gob distributor defined in claim 1, further comprising a terminal connected to said digital adapter circuit for inputting a setpoint value of a position of said member.

8. The gob distributor defined in claim 1 wherein said digital adapter circuit includes a microprocessor.

* * * * *